(12) United States Patent
Xu et al.

(10) Patent No.: US 11,824,380 B2
(45) Date of Patent: Nov. 21, 2023

(54) DC FAST CHARGING STATION FOR ELECTRIC VEHICLES

(71) Applicant: GENERAL ELECTRIC COMPANY, Schenectady, NY (US)

(72) Inventors: Fei Xu, Shanghai (CN); Ahmed Elasser, Niskayuna, NY (US); Silvio Colombi, Ticino (CH); Kum Kang Huh, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1054 days.

(21) Appl. No.: 16/475,464

(22) PCT Filed: Jan. 5, 2017

(86) PCT No.: PCT/CN2017/070267
§ 371 (c)(1),
(2) Date: Jul. 2, 2019

(87) PCT Pub. No.: WO2018/126393
PCT Pub. Date: Jul. 12, 2018

(65) Prior Publication Data
US 2019/0372465 A1 Dec. 5, 2019

(51) Int. Cl.
*B60L 53/10* (2019.01)
*H02J 7/00* (2006.01)
(Continued)

(52) U.S. Cl.
CPC ............ *H02J 7/0013* (2013.01); *B60L 53/11* (2019.02); *H02J 3/322* (2020.01); *H02J 7/02* (2013.01);
(Continued)

(58) Field of Classification Search
CPC .. H02M 3/1582; H02M 1/007; H02M 1/0074; H02M 1/008; B60L 53/10;
(Continued)

(56) References Cited

U.S. PATENT DOCUMENTS

2006/0245216 A1* 11/2006 Wu ...................... H02M 7/4833
363/13
2013/0010504 A1* 1/2013 Xiao ........................ H01F 3/12
363/35
(Continued)

FOREIGN PATENT DOCUMENTS

CN 101728961 A 6/2010
CN 102891613 A 1/2013
(Continued)

OTHER PUBLICATIONS

State Intellectual Property Office of the P.R.China, International Search Report, WIPO, dated Oct. 12, 2017, China.
(Continued)

*Primary Examiner* — Richard Isla
*Assistant Examiner* — Johali A Torres Ruiz
(74) *Attorney, Agent, or Firm* — Ziolkowski Patent Solutions Group, SC; Jean Testa

(57) ABSTRACT

A DC charging circuit for an electric vehicle includes a neutral-point clamped (NPC) rectifier and a DC/DC buck converter. The NPC rectifier is configured to convert three-phase AC power to a first DC voltage at a rectifier output stage. The DC/DC buck converter includes a first DC stage coupled to the rectifier output stage, and a second DC stage configured to be coupled to the electric vehicle. The DC/DC buck converter is configured to convert the first DC voltage to a second DC voltage to be supplied to the electric vehicle.

20 Claims, 12 Drawing Sheets

(51) Int. Cl.
*H02M 3/158* (2006.01)
*H02M 3/335* (2006.01)
*H02J 3/32* (2006.01)
*H02J 7/02* (2016.01)

(52) U.S. Cl.
CPC ......... *H02M 3/158* (2013.01); *H02M 3/1582* (2013.01); *H02M 3/33571* (2021.05); *H02M 3/33573* (2021.05); *H02J 2207/20* (2020.01); *H02J 2310/48* (2020.01)

(58) Field of Classification Search
CPC .. H02J 3/158; H02J 3/322; H02J 3/337; H02J 3/1582; H02J 3/1584; H02J 3/33576; H02J 7/0013; H02J 7/02; H02J 2207/20; H02J 2310/48
See application file for complete search history.

(56) References Cited

U.S. PATENT DOCUMENTS

| | | | |
|---|---|---|---|
| 2013/0026836 A1 | 1/2013 | Dighrasker et al. | |
| 2014/0211520 A1* | 7/2014 | Zhang | H02M 1/126 363/37 |
| 2015/0136505 A1* | 5/2015 | Bystedt | B60L 15/20 180/6.7 |
| 2015/0256003 A1* | 9/2015 | Yonetani | B60L 58/16 320/150 |
| 2015/0295403 A1* | 10/2015 | Lewis, III | H02M 7/44 307/26 |
| 2016/0211749 A1* | 7/2016 | Okada | H02M 3/158 |
| 2016/0285374 A1* | 9/2016 | Agamy | H02M 3/33584 |
| 2016/0288664 A1 | 10/2016 | Biagini et al. | |
| 2016/0375781 A1* | 12/2016 | Herke | B60L 53/53 320/109 |
| 2017/0179745 A1* | 6/2017 | Tritschler | B60L 53/24 |
| 2018/0154791 A1* | 6/2018 | Homma | B60L 53/51 |
| 2018/0162229 A1* | 6/2018 | Götz | H02J 7/0013 |

FOREIGN PATENT DOCUMENTS

| | | |
|---|---|---|
| CN | 203883694 U | 10/2014 |
| CN | 204597794 U | 8/2015 |
| CN | 105762803 A | 7/2016 |
| EP | 3113345 A1 | 1/2017 |
| TW | 201611468 A | 3/2016 |
| WO | 96/01518 A1 | 1/1996 |
| WO | 2014160488 A1 | 10/2014 |

OTHER PUBLICATIONS

Soeiro et al., "Three-Phase High Power Factor Mains Interface Concepts for Electric Vehicle Battery Charging Systems," Applied Power Electronics Conference and Exposition (APEC), 27th Annual IEEE, Feb. 5, 2012, pp. 2603-2610.

* cited by examiner

DC FAST CHARGING STATION FOR ELECTRIC VEHICLES

BACKGROUND

The field of the disclosure relates generally to charging of plug-in hybrid and electric vehicles and, more particularly, to a direct current (DC) fast charging station and energy management therein.

Generally, owners of plug-in hybrid and electric vehicles want to recharge their batteries as quickly as possible, akin to stopping at a traditional gas station to refuel. Many known charging systems for plug-in hybrid and electric vehicles utilize an on-board DC charger that converts available alternating current (AC) power to DC power for charging the vehicle's batteries. Fast charging generally requires a high current be delivered in a short period of time. Many DC chargers are integrated into plug-in hybrid and electric vehicles and are consequently limited in size, weight, and modularity. Such chargers are typically low-efficiency and have low power density.

BRIEF DESCRIPTION

In one aspect, a direct current (DC) charging circuit for an electric vehicle is provided. The DC charging circuit includes a neutral-point clamped (NPC) rectifier and a DC/DC buck converter. The NPC rectifier is configured to convert three-phase alternating current (AC) power to a first DC voltage at a rectifier output stage. The DC/DC buck converter includes a first DC stage coupled to the rectifier output stage, and a second DC stage configured to be coupled to the electric vehicle. The DC/DC buck converter is configured to convert the first DC voltage to a second DC voltage to be supplied to the electric vehicle.

In another aspect, a DC charging station for electric vehicles is provided. The DC charging station includes a multi-winding step-down transformer, a NPC rectifier, a DC distribution bus, and a first plurality of DC/DC buck converters. The multi-winding step-down transformer is configured to be coupled to a three-phase AC power source. The multi-winding step-down transformer is configured to generate a first three-phase AC voltage. The NPC rectifier is coupled to the multi-winding step-down transformer and is configured to convert the first three-phase AC voltage to a first DC voltage at a rectifier output stage. The DC distribution bus is coupled to the rectifier output stage. Each DC/DC buck converter of the first plurality of DC/DC buck converters includes a first DC stage coupled to the DC distribution bus, and a second DC stage configured to be coupled to a respective electric vehicle. Each DC/DC buck converter is configured to convert the first DC voltage to a respective second DC voltage to be supplied to the respective electric vehicle.

In yet another aspect, a DC charging station for electric vehicles is provided. The DC charging station includes a multi-winding step-down transformer, an AC distribution bus, and a plurality of DC fast charging modules. The multi-winding step-down transformer is configured to be coupled to a three-phase AC power source. The multi-winding step-down transformer is configured to generate a first three-phase AC voltage. The AC distribution bus is coupled to the multi-winding step-down transformer and is configured to supply the first three-phase AC voltage to the plurality of DC fast charging modules. Each DC fast charging module of the plurality of DC fast charging modules includes a NPC rectifier and a DC/DC buck converter. The NPC rectifier is coupled to the AC distribution bus and is configured to convert the first three-phase AC voltage to a first DC voltage at a rectifier output stage. The DC/DC buck converter includes a first DC stage coupled to the rectifier output stage, and a second DC stage configured to be coupled to a respective electric vehicle of the plurality of electric vehicles. The DC/DC buck converter is configured to convert the first DC voltage to a respective second DC voltage to be supplied to the respective electric vehicle.

DRAWINGS

These and other features, aspects, and advantages of the present disclosure will become better understood when the following detailed description is read with reference to the accompanying drawings in which like characters represent like parts throughout the drawings, wherein.

Figure 1:
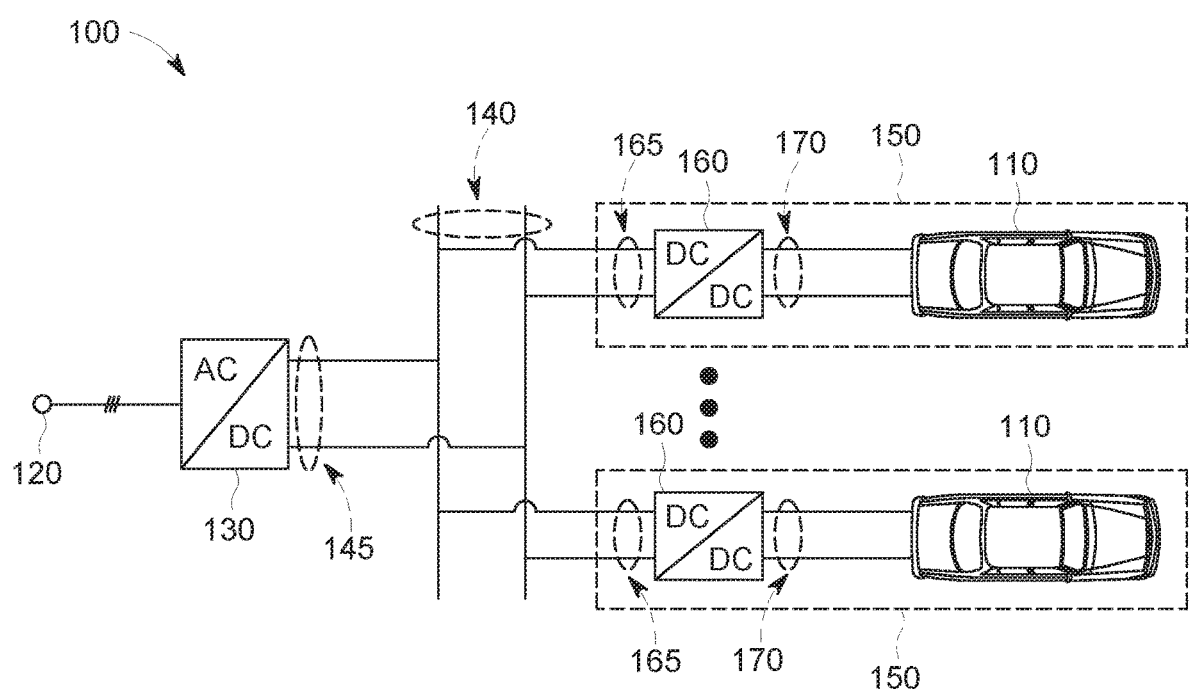
FIG. 1 is a schematic diagram of an exemplary DC fast charging station having a DC distribution bus for charging an electric vehicle.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Embodiments of the present disclosure provide DC fast charging capability for electric vehicles. More specifically, the present disclosure describes several architectures for DC fast charging stations, including stations having DC distribution busses and stations having AC distribution busses. The present disclosure further describes a DC fast charging module that enables modular assembly of components to achieve desired voltage and power needs. The present disclosure further describes several embodiments of AC/DC converters and DC/DC converters that, in combination, provide the fast charging demanded by owners of electric vehicles. Further, the present disclosure describes energy management strategies for sourcing charging currents for the electric vehicles from various energy storage solutions, including, for example, and without limitation, centralized batteries, distributed batteries, and electric vehicle batteries.

FIG. 1 is a schematic diagram of an exemplary DC fast charging station 100 for charging one or more electric vehicles 110. DC fast charging station 100 includes a three-phase AC power source 120 that provides three-phase AC power to a rectifier 130. In certain embodiments, for example, and without limitation, the three-phase AC power provided to rectifier 130 is a medium voltage three-phase voltage. In one such embodiment, three-phase 4160 Volt AC power is provided to rectifier 130. Rectifier 130 converts the three-phase AC power to a first DC voltage that is supplied to a DC distribution bus 140 at a rectifier output stage 145. DC distribution bus 140 supplies the first DC voltage to one or more charging positions 150 for respective electric vehicles 110. Each of charging positions 150 includes a DC/DC buck converter 160 that steps-down the first DC voltage to a second DC voltage that is supplied to electric vehicle 110 for charging one or more batteries. Each electric vehicle 110 is characterized by its charging requirements, including, for example, and without limitation, current, voltage, power, and energy. DC/DC buck converter 160 includes a DC input stage 165 coupled to DC distribution bus 140, and a DC output stage 170 that is configured to be coupled to electric vehicle 110.

Figure 2:
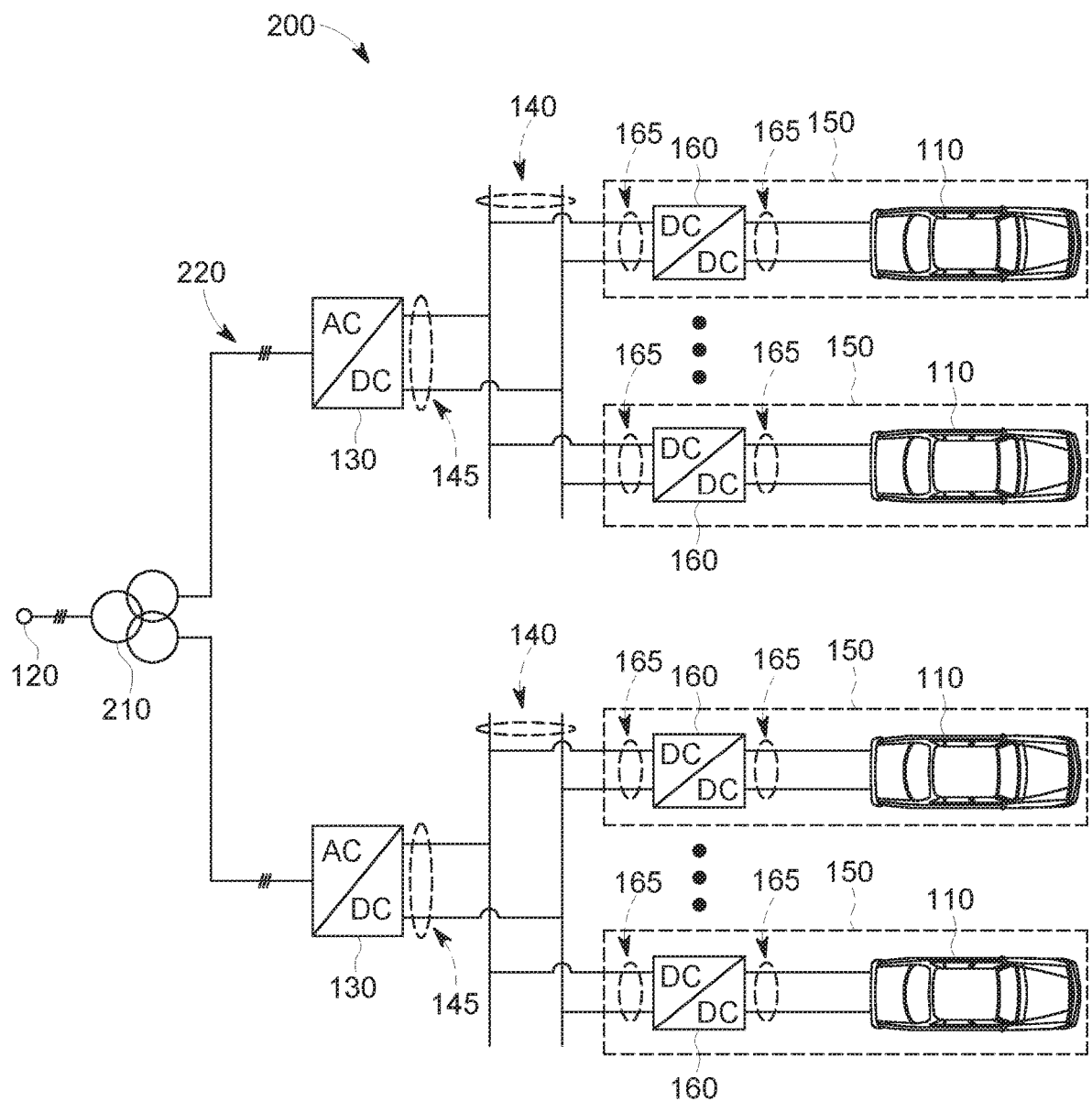
FIG. 2 is a schematic diagram of an alternative DC fast charging station having a one or more DC distribution busses for charging an electric vehicle.

FIG. 2 is a schematic diagram of an alternative DC fast charging station 200 for charging one or more electric vehicles 110. DC fast charging station 200 includes three-phase AC power source 120 that provides three-phase AC power to a multi-winding step-down transformer 210. Multi-winding step-down transformer 210 provides galvanic isolation between three-phase AC power source 120 and DC fast charging station 200. Multi-winding step-down transformer 210 is coupled to an intermediate AC bus 220 that distributes an intermediate AC voltage to one or more rectifiers 130. In one embodiment, for example, and without limitation, three-phase AC source 120 provides three-phase 4160 Volt AC power to multi-winding step-down transformer 210, which steps-down the three-phase 4160 Volt AC power to three-phase 480 Volt AC power. In such an embodiment, for example, each rectifier 130 is rated to supply 1 Megawatt of power to a respective DC distribution bus 140.

Each of DC distribution busses 140 operate as described above with respect to DC fast charging station 100 (shown in FIG. 1) to supply the first DC voltage to one or more charging positions 150. DC distribution busses 140 operate, for example, and without limitation, at 900 Volt DC to supply up to 300 kilowatts of power to each charging position 150. In alternative embodiments, DC distribution busses 140 may operate at higher or lower DC voltages, and DC/DC buck converters 160 may supply more or less power depending on the implementation of DC fast charging station 200.

Figure 3:
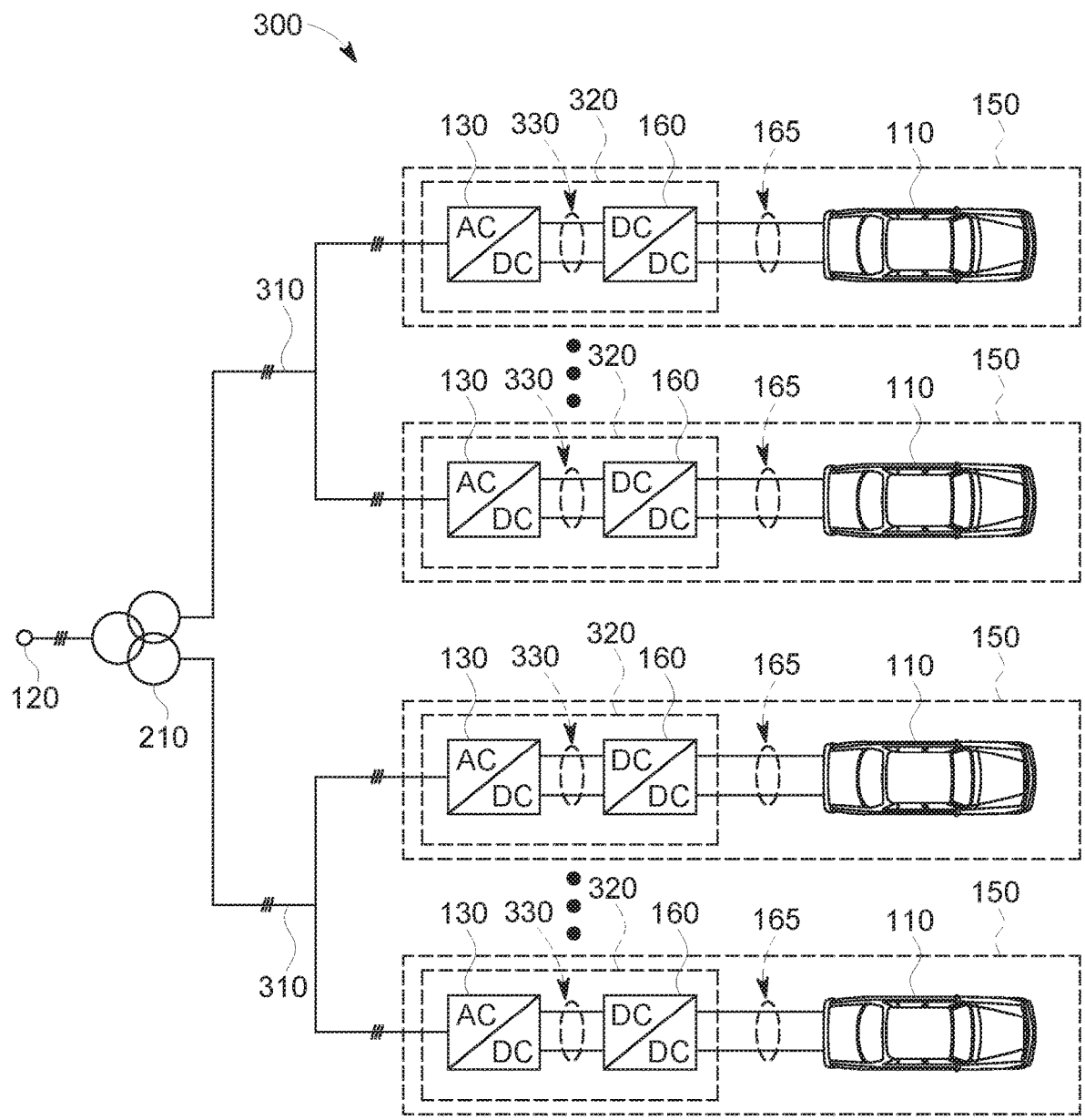
FIG. 3 is a schematic diagram of an alternative DC fast charging station having an AC distribution bus for charging an electric vehicle.

FIG. 3 is a schematic diagram of another alternative DC fast charging station 300 for charging one or more electric vehicles 110. DC fast charging station 200 includes three-phase AC power source 120 that provides three-phase AC power to multi-winding step-down transformer 210. Multi-winding step-down transformer 210 provides galvanic isolation between three-phase AC power source 120 and DC fast charging station 300. Multi-winding step-down transformer 210 is coupled to an AC distribution bus 310 that distributes three-phase AC voltage to one or more DC fast charging modules 320 for respective charging positions 150. Each of DC fast charging modules 320 includes a rectifier 130 coupled to a DC/DC buck converter 160 by a DC bus 330. In one embodiment, for example, and without limitation, three-phase AC source 120 provides three-phase 4160 Volt AC power to multi-winding step-down transformer 210, which steps-down the three-phase 4160 Volt AC power to three-phase 480 Volt AC power that is put onto AC distribution bus 310. In such an embodiment, each DC fast charger module is configured to supply 300 kilowatts to a respective vehicle 110.

Figure 4:
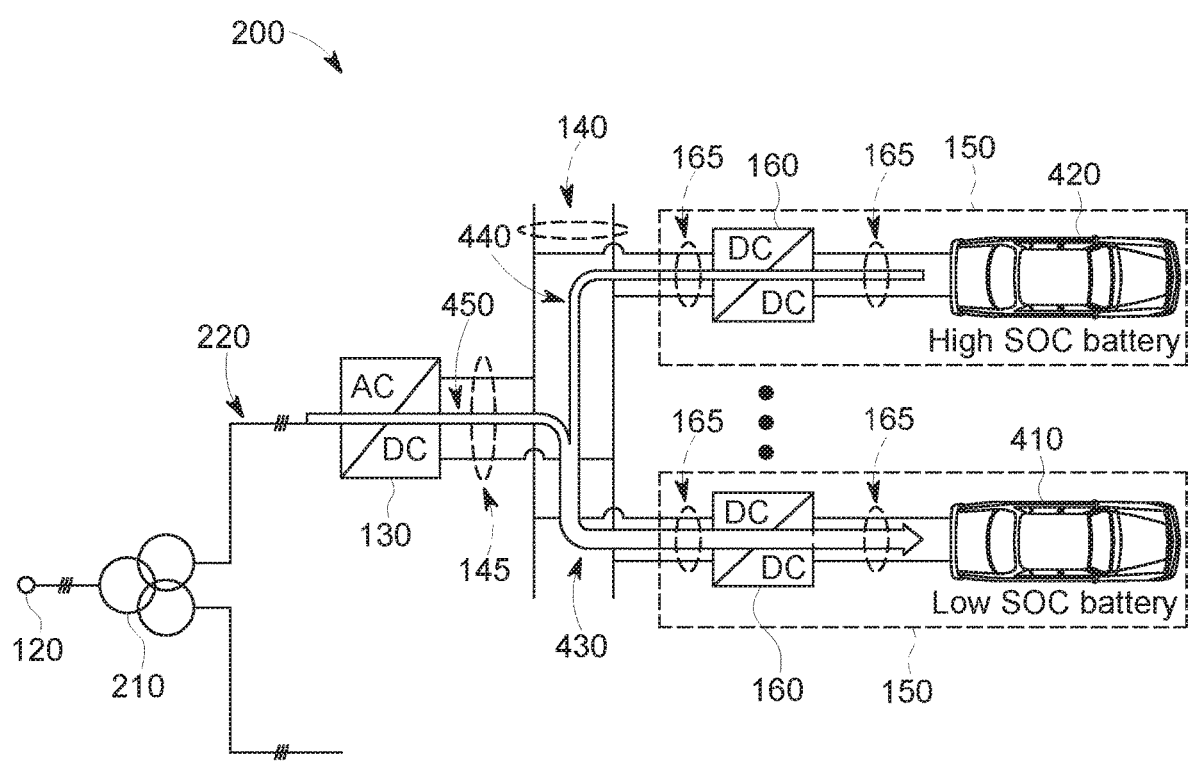
FIG. 4 is a schematic diagram illustrating an exemplary energy management strategy for use in the DC fast charging stations shown in FIGS. 1 and 2.

FIG. 4 is a schematic diagram illustrating an exemplary energy management strategy for use in DC fast charging station 100 and 200 (shown in FIGS. 1 and 2). DC fast charging station 200 is configured to charge an electric vehicle 410 having a battery with a low state-of-charge (SOC) and an electric vehicle 420 having a battery with a high SOC. During typical charging of electric vehicles 410 and 420, current is sourced from three-phase AC power source 120 and distributed to respective charging positions 150. In the energy management strategy described herein, a charging current 430 supplied to electric vehicle 410, having a battery with a low SOC, is sourced from a combination of three-phase AC power source 120 and the high-SOC battery of electric vehicle 420. More specifically, DC/DC buck converter 160 operates bi-directionally to enable a battery current 440 from electric vehicle 420 to be supplied to DC distribution bus 140. Additionally, rectifier 130 supplies current provided by three-phase AC power source 120, multi-winding step-down transformer 210, and intermediate AC bus 220, also referred to as a grid current 450. The sourcing of battery current 440 from electric vehicle 420, having a high-SOC battery, enables DC fast charging station 200 to more efficiently provide charging current 430 to electric vehicle 410.

Figure 5:
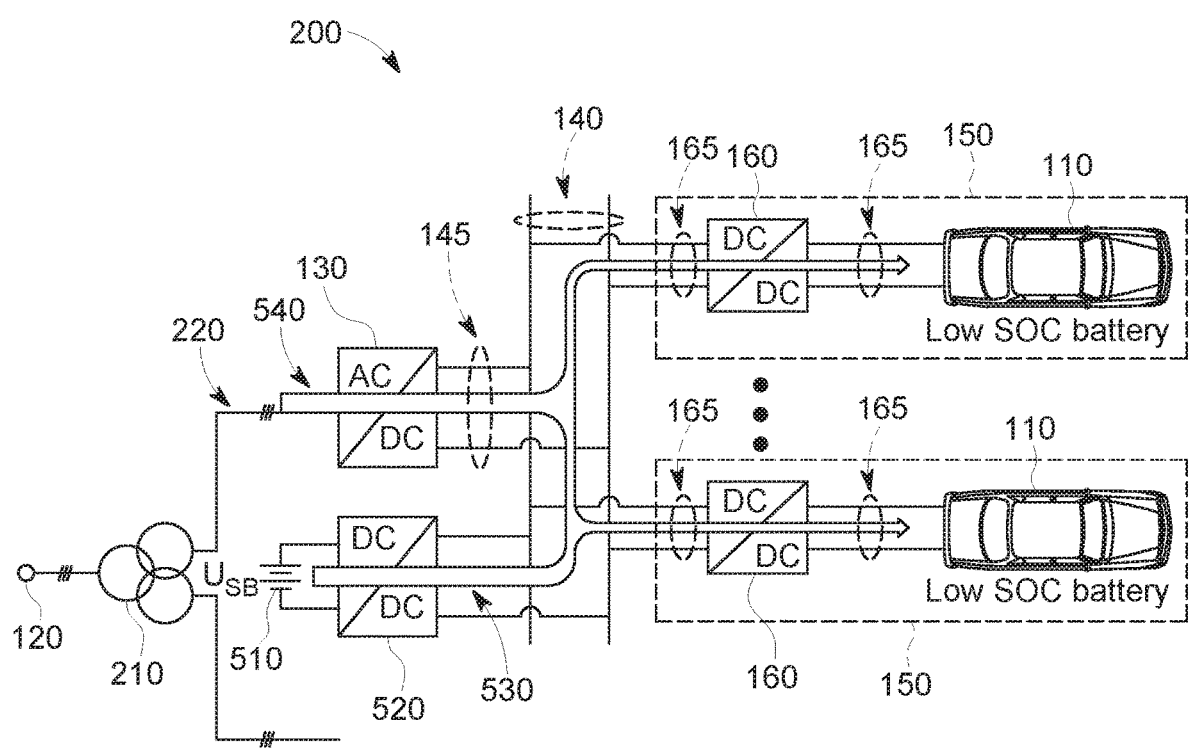
FIG. 5 is a schematic diagram of the DC fast charging stations shown in FIG. 2 including a central storage battery.

FIG. 5 is a schematic diagram of DC fast charging station 200 (shown in FIG. 2) and further including a central storage battery 510. DC fast charging station 200 is configured to charge electric vehicles 110 from a combination of power sources, including three-phase AC power source 120 and central storage battery 510. More specifically, central storage battery 510 is coupled to DC distribution bus 140 through a DC/DC converter 520 to provide a battery current 530 to DC distribution bus 140. As described above, three-phase AC power source 120 provides three-phase AC power to intermediate AC bus 220 through multi-winding step-down transformer 210. The three-phase AC power is converted to the first DC voltage by rectifier 130. Rectifier 130 supplies the grid current to DC distribution bus 140. DC distribution bus 140 supplies the first DC voltage to one or more charging positions 150 for charging electric vehicles 110. DC/DC converter 520 supplies battery current 530 to DC distribution bus 140 during peak demand periods of time to reduce the grid current 540 necessary to charge electric vehicles 110. Conversely, when demand is low, DC/DC converter 520 charges central storage battery 510 to store energy for later peak demand times.

Figure 6:
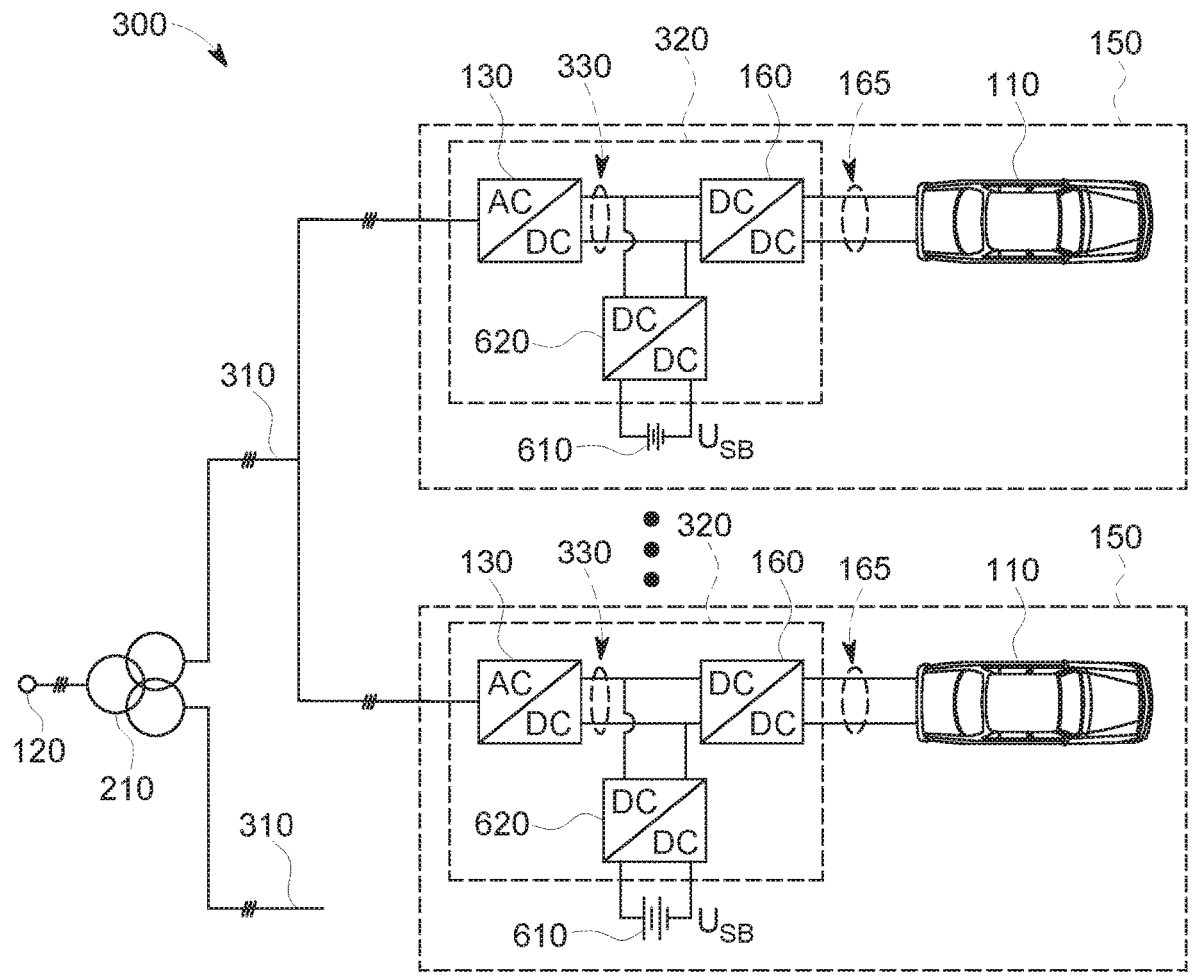
FIG. 6 is a schematic diagram of the DC fast charging station shown in FIG. 3 including dedicated storage batteries.

FIG. 6 is a schematic diagram of DC fast charging station 300 (shown in FIG. 3) and further including dedicated storage batteries 610 for each of charging positions 150. DC fast charging station 300 is configured to charge electric vehicles 110 from a combination of power sources, including three-phase AC power source 120 and dedicated storage batteries 610. More specifically, each dedicated storage battery 610 is coupled to a respective first DC bus 330 of a corresponding DC fast charging module 320 through a DC/DC converter 620. As described above, three-phase AC power source 120 provides three-phase AC power to AC distribution bus 310 through multi-winding step-down transformer 210. The three-phase AC power is supplied to each DC fast charging module 320, which converts the three-phase AC power to the first DC voltage using rectifier 130. Rectifier 130 supplies grid current to DC bus 330. Dedicated storage battery 610 supplies battery current to DC bus 330 through DC/DC converter 620 to charge electric vehicle 110 during peak demand periods of time. Conversely, when demand is low, DC/DC converter 620 charges dedicated storage battery 610 to store energy, sourced from rectifier 130, for later peak demand times.

Figure 7:
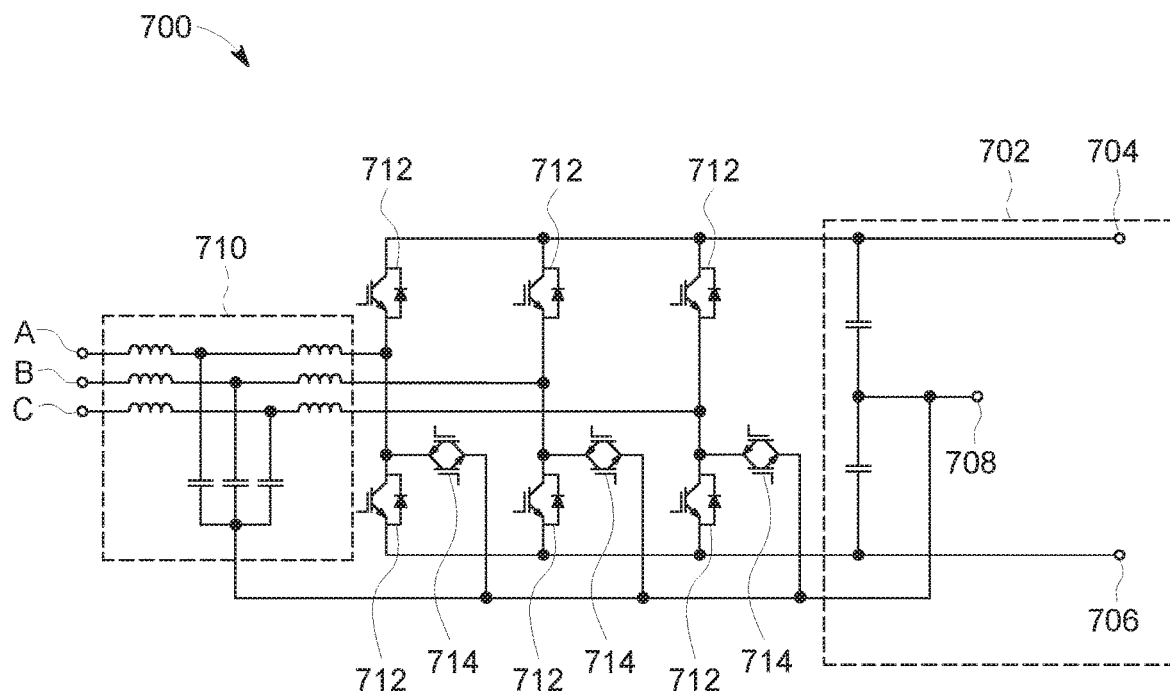
FIG. 7 is a schematic diagram of an exemplary neutral point clamped (NPC) rectifier for use in the DC fast charging stations shown in FIGS. 1-3.

FIG. 7 is a schematic diagram of an exemplary rectifier 700 for use in DC fast charging stations 100, 200, and 300 (shown in FIGS. 1-3, respectively). Rectifier 700 is a neutral point clamped (NPC) three-level rectifier having an output stage 702 that includes a first output level 704, a second output level 706, and a midpoint 708. Rectifier 700 includes an input filter 710 that is configured to be coupled to a three-phase AC power source that supplies phases A, B, and C. Rectifier 700 includes a pair of semiconductor switches 712 for each of phases A, B, and C. Each pair of semiconductor switches 712 for a respective phase cooperates to rectify the AC signal into a DC voltage at output stage 702. Each semiconductor switch 712 may be embodied in, for example, and without limitation, an insulated-gate bipolar transistor (IGBT), a metal-oxide semiconductor field-effect transistor (MOSFET), a bipolar junction transistor (BJT), a gate turn-off (GTO) thyristor, an integrated gate-commutated thyristor (IGCT), a metal-oxide semiconductor (MOS) controlled transistor (MCT), or any other suitable thyristor, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN). Rectifier 700 includes respective reverse blocking devices 714, such as, for example, and without limitation, IGBTs, MOSFETs, BJTs, GTOs, IGCTs, MCTs, or any other suitable switching device, for phases A, B, and C.

Figure 8:
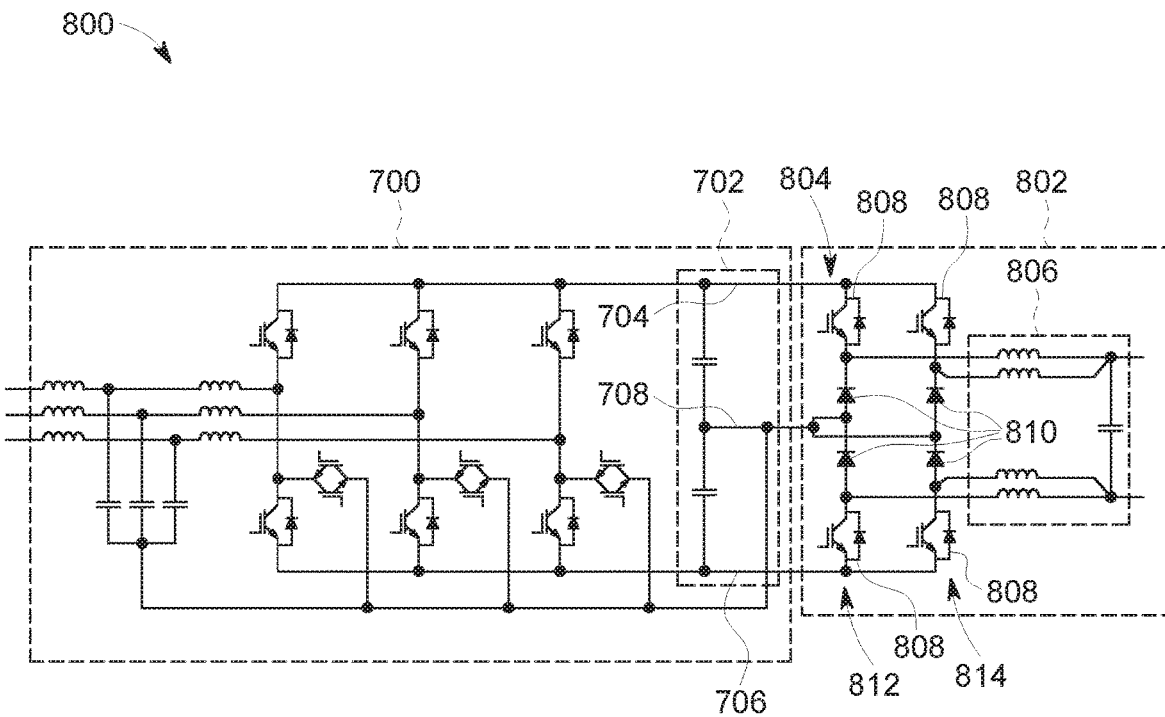
FIG. 8 is a schematic diagram of an exemplary uni-directional three-level DC/DC buck converter for use in the DC fast charging stations shown in FIGS. 1-3.

FIG. 8 is a schematic diagram of an exemplary DC fast charging module 800, including a uni-directional three-level DC/DC buck converter 802 for use in DC fast charging stations 100, 200, and 300 (shown in FIGS. 1-3). DC fast charging module 800 includes rectifier 700 that couples to uni-directional three-level DC/DC buck converter 802 at output stage 702. Rectifier 700 supplies a first DC voltage to a DC input stage 804 of uni-directional three-level DC/DC buck converter 802, which operates in a buck-mode, stepping down the first DC voltage to a second, lower, DC voltage, and increasing the current output at a DC output stage 806. Uni-directional three-level DC/DC buck converter 802 includes semiconductor switches 808 coupled in series with diodes 810 and arranged in first and second branches 812 and 814. Each of branches 812 and 814 includes a semiconductor switch 808 and serially coupled diode 810 coupled between first output level 704 and midpoint 708, and between second output level 706 and midpoint 708. Each semiconductor switch 808 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

Outputs of each of first and second branches 812 and 814 are interleaved at DC output stage 806 to improve efficiency of uni-directional three-level DC/DC buck converter 802 and to reduce current ripple. Operation in buck mode enables DC fast charging module 800 to interface with various voltage ratings of batteries for electric vehicles 110 (shown in FIGS. 1-3). Moreover, DC fast charging module 800 is scalable from 10 kilowatts to 1 Megawatt, and can be combined with additional DC fast charging modules to achieve a desired voltage and power rating.

Figure 9:
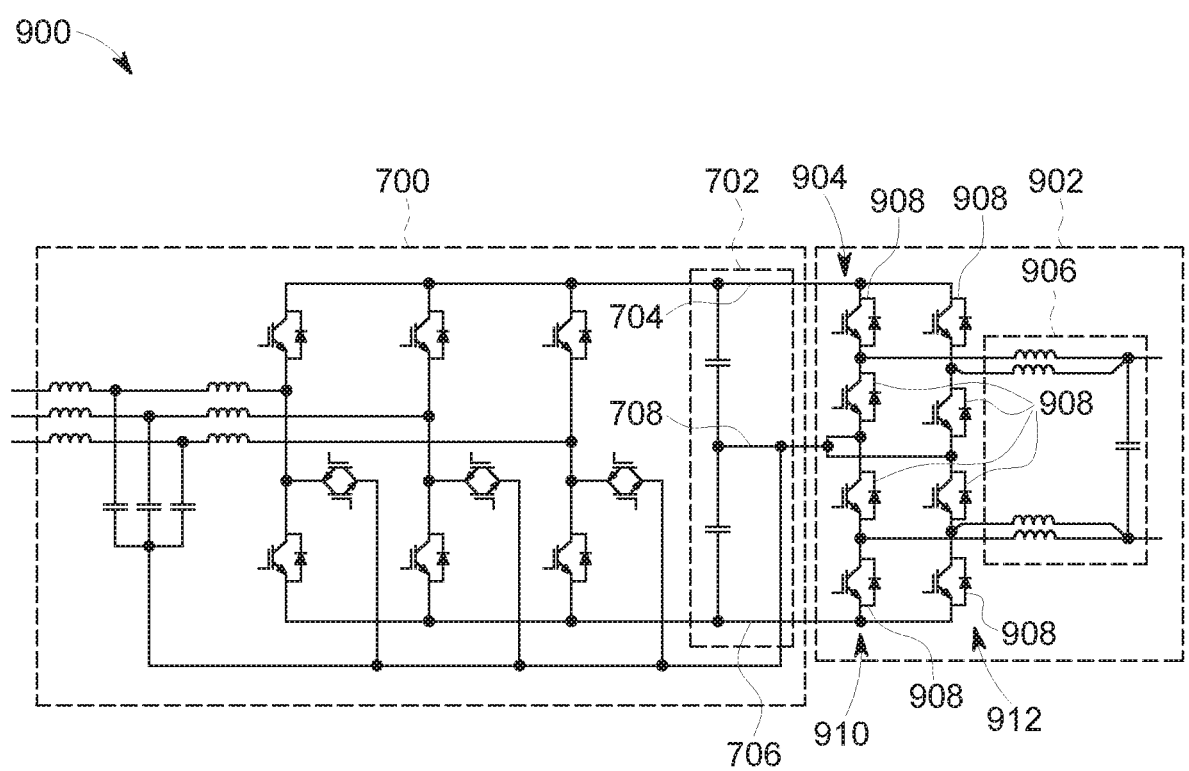
FIG. 9 is a schematic diagram of an exemplary bi-directional three-level DC/DC buck converter for use in the DC fast charging stations shown in FIGS. 1-3.

FIG. 9 is a schematic diagram of an alternative DC fast charging module 900, including a bi-directional three-level DC/DC buck converter 902 for use in DC fast charging stations 100, 200, and 300 (shown in FIGS. 1-3). DC fast charging module 900 includes rectifier 700 that couples to bi-directional three-level DC/DC buck converter 902 at output stage 702. Bi-directional three-level DC/DC buck converter 902 enables current flow from one or more batteries of electric vehicle 110 back into rectifier 700. In normal operation, rectifier 700 supplies a first DC voltage to a DC input stage 904 of bi-directional three-level DC/DC buck converter 902, which operates in a buck-mode, stepping down the first DC voltage to a second, lower, DC voltage, and increasing the current output at a DC output stage 906. Bi-directional three-level DC/DC buck converter 902 includes semiconductor switches 908 coupled in series and arranged in first and second branches 910 and 912. Each of semiconductor switches 908 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

Each of branches 910 and 912 includes series-coupled semiconductor switches 908 coupled between first output level 704 and midpoint 708, and between second output level 706 and midpoint 708. Outputs of each of first and second branches 910 and 912 are interleaved at DC output stage 906 to improve efficiency of bi-directional three-level DC/DC buck converter 902 and to reduce current ripple. Operation in buck mode enables DC fast charging module 900 to interface with various voltage ratings of batteries for electric vehicles 110 (shown in FIGS. 1-3). Moreover, DC fast charging module 900 is scalable from, for example, and without limitation, 10 kilowatts to 1 Megawatt, and can be combined with additional DC fast charging modules to achieve a desired voltage and power rating.

Figure 10:
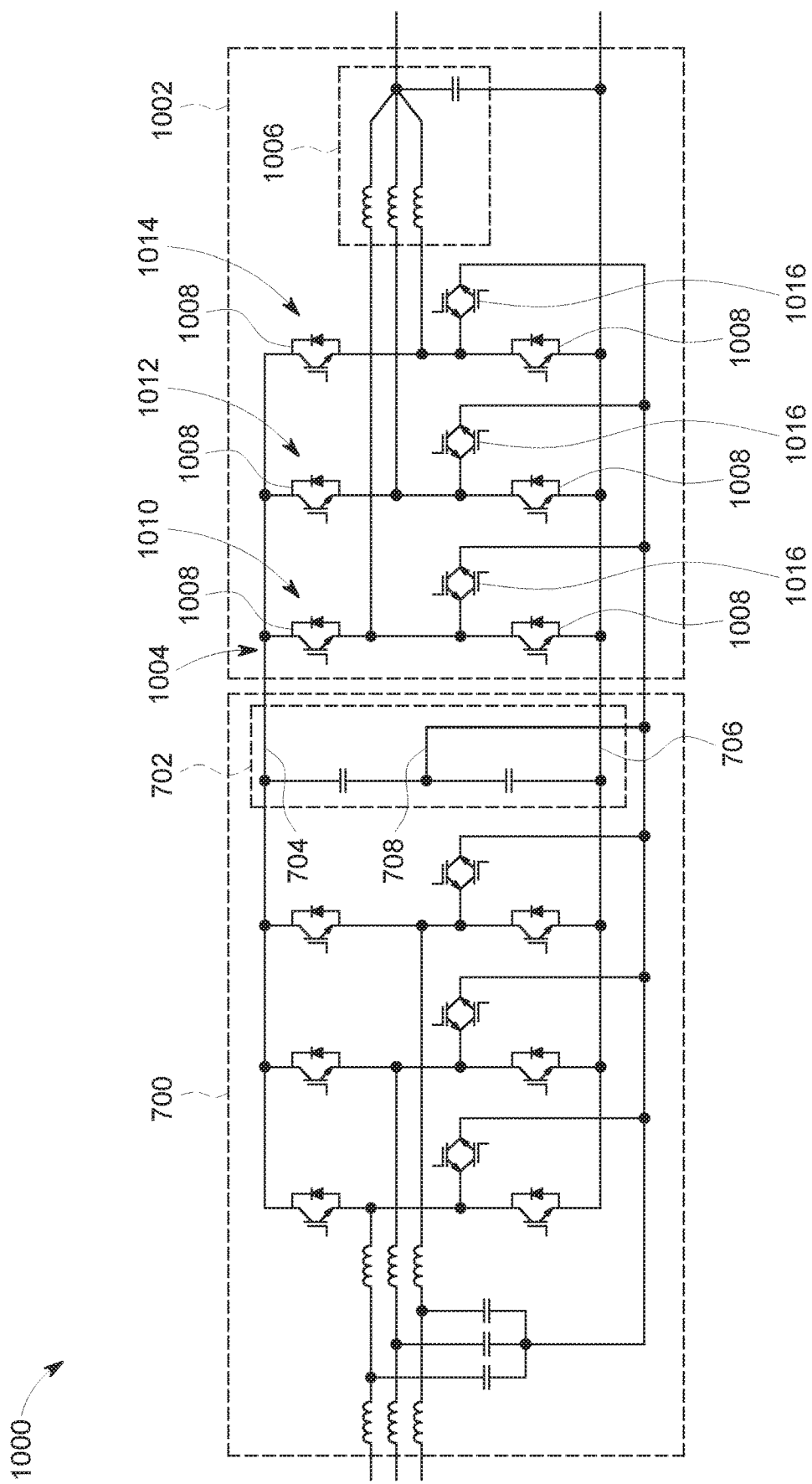
FIG. 10 is a schematic diagram of an exemplary inter-leaved NPC three-level DC/DC buck converter for use in the DC fast charging stations shown in FIGS. 1-3.

FIG. 10 is a schematic diagram of another alternative DC fast charging module 1000, including an interleaved NPC three-level DC/DC buck converter 1002 for use in DC fast charging stations 100, 200, and 300 (shown in FIGS. 1-3). DC fast charging module 1000 includes rectifier 700 that couples to NPC three-level DC/DC buck converter 1002 at output stage 702. Rectifier 700 supplies a first DC voltage to a DC input stage 1004 of NPC three-level DC/DC buck converter 1002, which operates in a buck-mode, stepping down the first DC voltage to a second, lower, DC voltage, and increasing the current output at a DC output stage 1006. NPC three-level DC/DC buck converter 1002 includes semiconductor switches 1008 coupled in series and arranged in first, second, and third branches 1010, 1012, and 1014. Each of semiconductor switches 1008 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

Each of branches 1010, 1012, and 1014 includes series-coupled semiconductor switches 1008 coupled between first output level 704 and second output level 706. Midpoints of each of branches 1010, 1012, and 1014 are interleaved at second DC stage 1006 to improve the efficiency of NPC three-level DC/DC buck converter 1002 and to reduce current ripple. Each of branches 1010, 1012, and 1014 includes a reverse blocking devices 1016, such as, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN). Operation in buck mode enables DC fast charging module 1000 to interface with various voltage ratings of batteries for electric vehicles 110 (shown in FIGS. 1-3). Moreover, DC fast charging module 1000 is scalable from, for example, and without limitation, 10 kilowatts to 1 Megawatt, and can be combined with additional DC fast charging modules to achieve a desired voltage and power rating.

Figure 11:
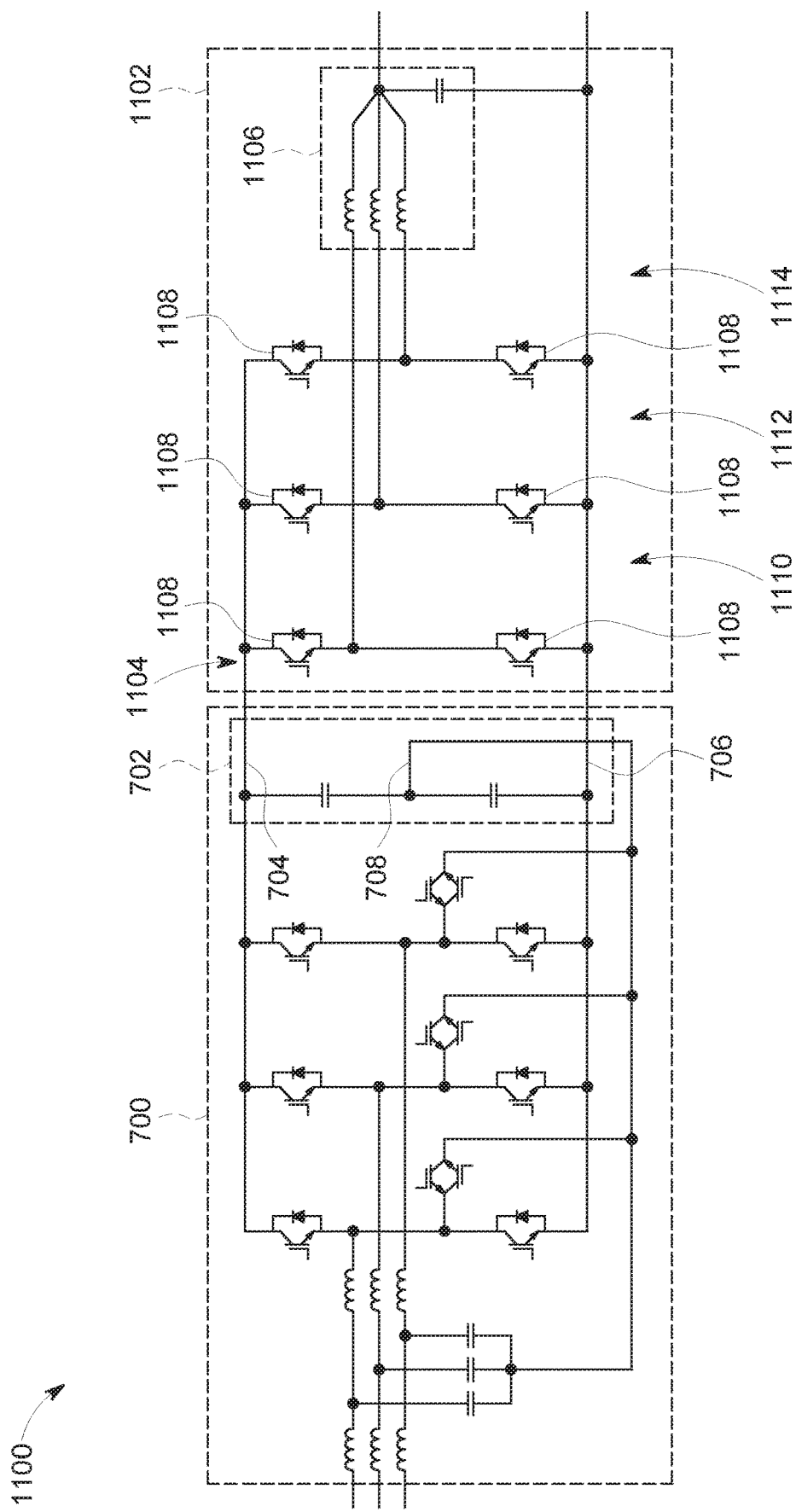
FIG. 11 is a schematic diagram of an exemplary inter-leaved bi-directional two-level DC/DC buck converter for use in the DC fast charging stations shown in FIGS. 1-3.

FIG. 11 is a schematic diagram of yet another alternative DC fast charging module 1100, including an interleaved two-level DC/DC buck converter 1102 for use in DC fast charging stations 100, 200, and 300 (shown in FIGS. 1-3). DC fast charging module 1100 includes rectifier 700 that couples to interleaved two-level DC/DC buck converter 1102 at output stage 702. Rectifier 700 supplies a first DC voltage to a DC input stage 1104 of interleaved two-level DC/DC buck converter 1102, which operates in a buck-mode, stepping down the first DC voltage to a second, lower, DC voltage, and increasing the current output at a DC output stage 1106. Interleaved two-level DC/DC buck converter 1102 includes semiconductor switches 1108 coupled in series and arranged in first, second, and third branches 1110, 1112, and 1114. Each semiconductor switch 1108 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

Each of branches 1110, 1112, and 1114 includes series-coupled semiconductor switches 1108 coupled between first output level 704 and second output level 706. Midpoints of each of branches 1110, 1112, and 1114 are interleaved at second DC stage 1106 to improve the efficiency of NPC three-level DC/DC buck converter 1102 and to reduce current ripple. Operation in buck mode enables DC fast charging module 1100 to interface with various voltage ratings of batteries for electric vehicles 110 (shown in FIGS. 1-3). Moreover, DC fast charging module 1100 is scalable from, for example, and without limitation, 10 kilowatts to 1

Megawatt, and can be combined with additional DC fast charging modules to achieve a desired voltage and power rating.

Figure 12:
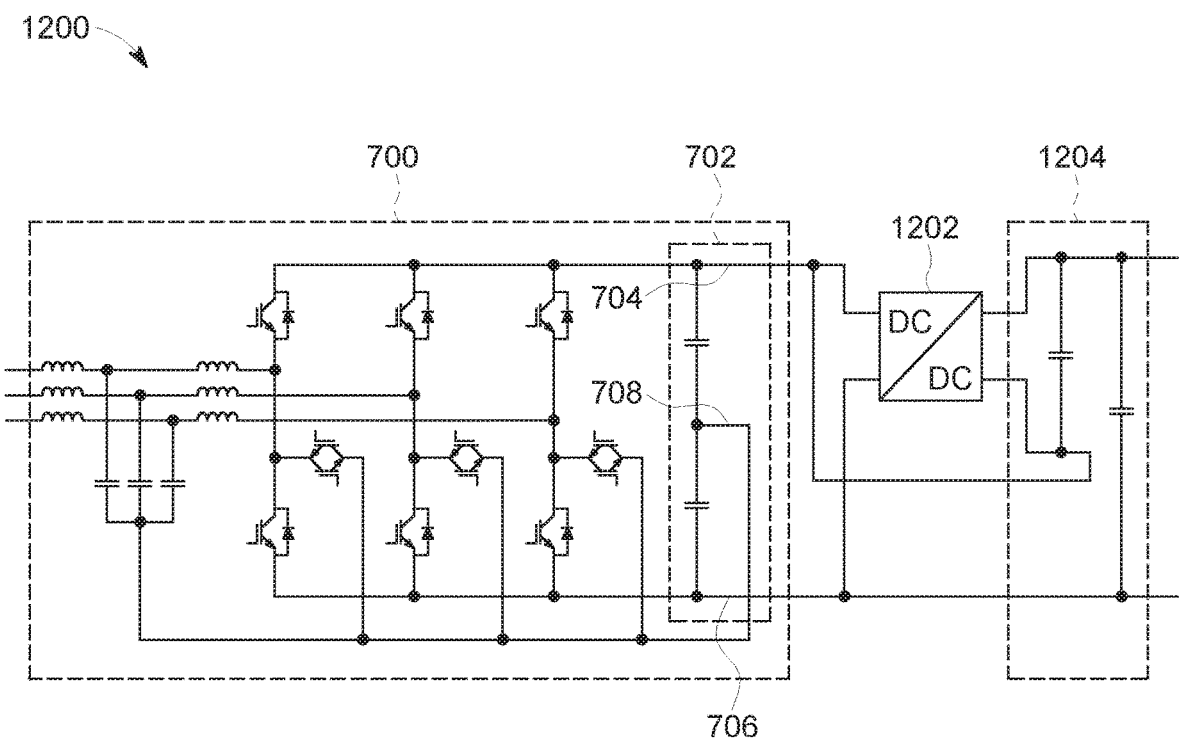
FIG. 12 is a schematic diagram of an exemplary DC fast charging module having a partial power conversion DC/DC buck converter for use in the DC fast charging stations shown in FIGS. 1-3.

FIG. 12 is a schematic diagram of an exemplary DC fast charging module 1200, including a partial power conversion DC/DC buck converter 1202 for use in DC fast charging stations 100, 200, and 300 (shown in FIGS. 1-3). DC fast charging module 1200 includes NPC rectifier 700 that couples to partial power conversion DC/DC buck converter 1202 at output stage 702. NPC rectifier 700 supplies a first DC voltage to partial power conversion DC/DC buck converter 1202, which operates in a buck-mode, stepping down the first DC voltage to a second, lower, DC voltage, and increasing the current output at a DC output stage 1204. NPC rectifier 700 supplies second output level 706 to DC output stage 1204, while partial power conversion DC/DC buck converter 1202 regulates the second DC voltage at DC output stage 1204.

Figure 13:
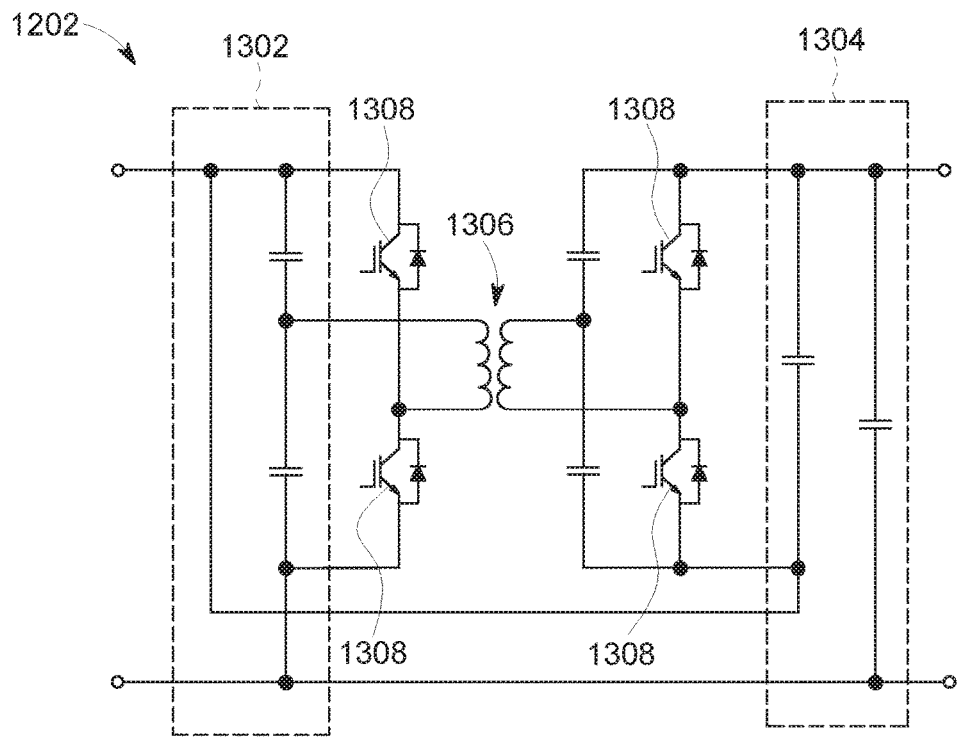
FIG. 13 is a schematic diagram of an exemplary partial power conversion DC/DC buck converter for use in the DC fast charging module shown in FIG. 12.
Figure 14:
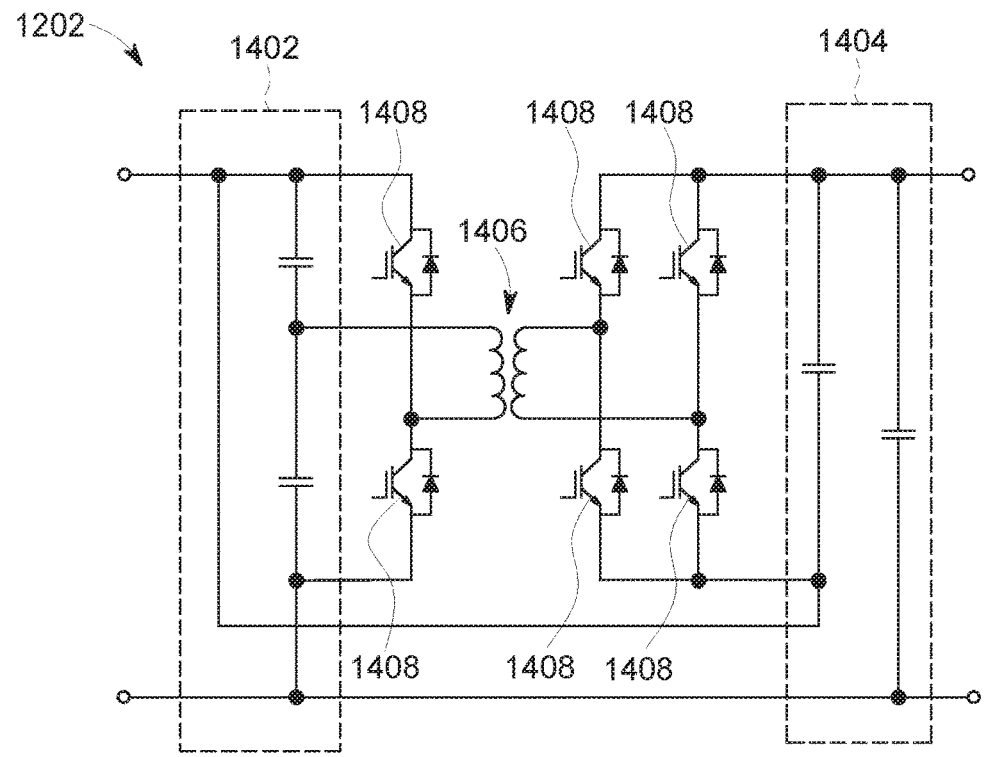
FIG. 14 is a schematic diagram of an alternative partial power conversion DC/DC buck converter for use in the DC fast charging module shown in FIG. 12.
Figure 15:
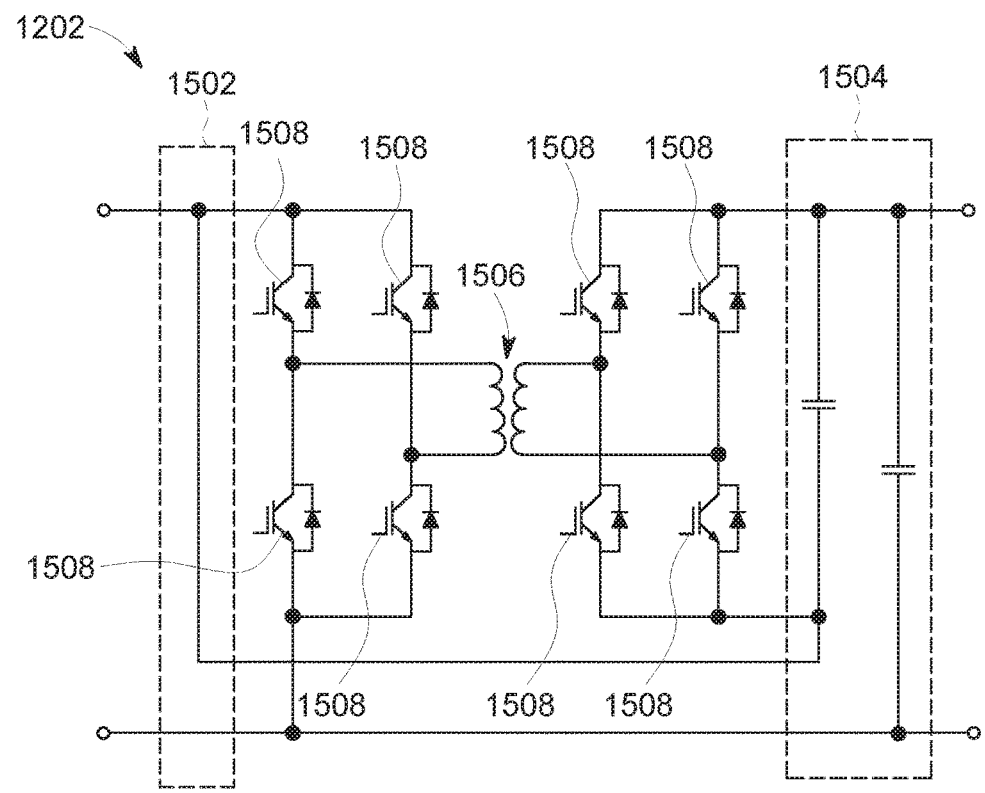
FIG. 15 is a schematic diagram of another alternative partial power conversion DC/DC buck converter for use in the DC fast charging module shown in FIG. 12.

FIGS. 13-15 are schematic diagrams of exemplary partial power conversion DC/DC buck converters 1202 for use in DC fast charging module 1200 (shown in FIG. 12). FIG. 13 illustrates one exemplary embodiment of partial power conversion DC/DC buck converter 1202, including a first DC stage 1302 and a second DC stage 1304. A DC input voltage is received at first DC stage 1302 and is converted to a DC output voltage at second DC stage 1304. Partial power conversion DC/DC buck converter 1202 also includes a transformer 1306 and semiconductor switches 1308 for carrying out the DC/DC conversion. Each semiconductor switch 1308 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

FIG. 14 illustrates an alternative embodiment of partial power conversion DC/DC buck converter 1202, including a first DC stage 1402 and a second DC stage 14304. A DC input voltage is received at first DC stage 1402 and is converted to a DC output voltage at second DC stage 1404. Partial power conversion DC/DC buck converter 1202 also includes a transformer 1406 and semiconductor switches 1408 for carrying out the DC/DC conversion. Each semiconductor switch 1408 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

FIG. 15 illustrates another alternative embodiment of partial power conversion DC/DC buck converter 1202, including a first DC stage 1502 and a second DC stage 1504. A DC input voltage is received at first DC stage 1502 and is converted to a DC output voltage at second DC stage 1504. Partial power conversion DC/DC buck converter 1202 also includes a transformer 1506 and semiconductor switches 1508 for carrying out the DC/DC conversion. Each semiconductor switch 1508 may be embodied in, for example, and without limitation, IGBTs, MOSFETs, BJTs, GTOs, IGCTs, MCTs, or any other suitable switching device. Moreover, semiconductor devices described above may be implemented using any suitable material, including, for example, and without limitation, Silicon (Si) and wide bandgap materials such as Silicon Carbide (SiC) and Gallium Nitride (GaN).

The above described embodiments of the present disclosure provide DC fast charging capability for electric vehicles. More specifically, the present disclosure describes several architectures for DC fast charging stations, including stations having DC distribution busses and stations having AC distribution busses. The present disclosure further describes a DC fast charging module that enables modular assembly of components to achieve desired voltage and power needs. The present disclosure further describes several embodiments of AC/DC converters and DC/DC converters that, in combination, provide the fast charging demanded by electric vehicles. Further, the present disclosure describes energy management strategies for sourcing charging currents for the electric vehicles from various energy storage solutions, including, for example, and without limitation, centralized batteries, distributed batteries, and electric vehicle batteries.

An exemplary technical effect of the methods, systems, and apparatus described herein includes at least one of: (a) reducing current ripple supplied to the electric vehicle; (b) improving DC/DC conversion efficiency; (c) providing modular DC fast charging devices to accommodate a greater variety of power and voltage demands for electric vehicles; (d) eliminating the need for a DC fast charging device integrated in the electric vehicle, thereby reducing weight and improving electric vehicle efficiency; (e) providing an adjustable DC voltage; (f) improving power density in DC fast charging stations; (g) reducing grid current demand during peak times through use of centralized batteries or dedicated storage batteries for each charging position; and (h) sourcing charging current for a low SOC electric vehicle battery at least partially from a high SOC electric vehicle battery.

Exemplary embodiments of methods, systems, and apparatus for DC fast charging stations are not limited to the specific embodiments described herein, but rather, components of systems and/or steps of the methods may be utilized independently and separately from other components and/or steps described herein. For example, the methods may also be used in combination with other non-conventional fast chargers, and are not limited to practice with only the systems and methods as described herein. Rather, the exemplary embodiment can be implemented and utilized in connection with many other applications, equipment, and systems that may benefit from increased efficiency, reduced operational cost, and reduced capital expenditure.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A direct current (DC) charging circuit for electric vehicles, said DC charging circuit comprising:
   a neutral-point clamped (NPC) rectifier configured to convert three-phase alternating current (AC) power to a first DC voltage at a rectifier output stage; and
   a bi-directional DC/DC buck converter comprising:
     a first DC stage coupled to said rectifier output stage and configured to receive the first DC voltage; and
     a second DC stage configured to be coupled to a first electric vehicle;
   wherein, upon being coupled to the first electric vehicle, said bi-directional DC/DC buck converter is configured to convert the first DC voltage to a second DC voltage to be supplied to a battery of the first electric vehicle if a state of charge of the battery of the first electric vehicle is below a state of charge of a battery of a second electric vehicle coupled to the DC charging circuit; and draw current from the battery of the first electric vehicle if the state of charge of the first electric vehicle is above the state of charge of the battery of the second electric vehicle.

2. The DC charging circuit in accordance with claim 1, wherein said NPC rectifier comprises an NPC 3-level converter and a reverse-blocking insulated-gate bipolar transistor (IGBT).

3. The DC charging circuit in accordance with claim 1, wherein said bi-directional DC/DC buck converter comprises:
   a DC input stage comprising at least two branches; and
   a DC output stage at which the at least two branches are interleaved.

4. The DC charging circuit in accordance with claim 1, wherein said bi-directional DC/DC buck converter comprises a bi-directional three-level DC/DC buck converter.

5. The DC charging circuit in accordance with claim 1, wherein said bi-directional DC/DC buck converter comprises:
   an NPC 3-level converter; and
   three interleaved DC output stages configured to be coupled to the electric vehicle.

6. The DC charging circuit in accordance with claim 1, wherein said bi-directional DC/DC buck converter comprises a bi-directional two-level DC/DC buck converter.

7. The DC charging circuit in accordance with claim 1, wherein said rectifier output stage is further coupled to said second DC stage to partially supply the first DC voltage to the first electric vehicle.

8. The DC charging circuit in accordance with claim 7, wherein said bi-directional DC/DC buck converter comprises a partial power conversion DC/DC converter.

9. A direct current (DC) charging station for electric vehicles, said DC charging station comprising:
   a multi-winding step-down transformer configured to be coupled to a three-phase alternating current (AC) power source, said multi-winding step-down transformer configured to generate a first three-phase AC voltage;
   a neutral-point clamped (NPC) rectifier coupled to said multi-winding step-down transformer and configured to convert the first three-phase AC voltage to a first DC voltage at a rectifier output stage;
   a DC distribution bus coupled to said rectifier output stage; and
   a first plurality of DC/DC buck converters, each DC/DC buck converter of the first plurality of DC/DC buck converters comprising a first DC stage coupled to said DC distribution bus and a second DC stage configured to be coupled to a respective electric vehicle, said second DC stage further configured to convert the first DC voltage to a respective second DC voltage to be supplied to the respective electric vehicle;
   wherein said first plurality of DC/DC buck converters comprises:
     a first DC/DC buck converter configured to couple to a first electric vehicle having a first battery at a first state of charge; and
     a second DC/DC buck converter configured to couple to a second electric vehicle having a second battery at a second state of charge;
   wherein, when said first state of charge of said first battery comprises a higher state of charge than said second state of charge of said second battery, said first DC/DC buck converter is configured to supply current from said first battery to said DC distribution bus; and
   wherein, when said second state of charge of said second battery comprises a higher state of charge than said first state of charge of said first battery, said second DC/DC buck converter is configured to supply current from said second battery to said DC distribution bus.

10. The DC charging station in accordance with claim 9 further comprising:
    a second neutral-point clamped (NPC) rectifier coupled to said multi-winding step-down transformer and configured to convert the first three-phase AC voltage to the first DC voltage at a second rectifier output stage;
    a second DC distribution bus coupled to said second rectifier output stage; and
    a second plurality of DC/DC buck converters, each DC/DC buck converter of said second plurality of DC/DC buck converters comprising:
      a first DC stage coupled to said second DC distribution bus; and
      a second DC stage configured to be coupled to a respective electric vehicle, said second DC stage further configured to convert the first DC voltage to a respective second DC voltage to be supplied to the respective electric vehicle.

11. The DC charging station in accordance with claim 9 further comprising a central storage battery coupled to said DC distribution bus through a battery DC/DC power converter, said battery DC/DC power converter configured to charge said central storage battery from said DC distribution bus during a low-demand period of time and supply current from said central storage battery to said DC distribution bus during a peak-demand period of time.

12. The DC charging station in accordance with claim 9, wherein said NPC rectifier comprises an NPC 3-level converter and a reverse-blocking insulated-gate bipolar transistor (IGBT).

13. The DC charging station in accordance with claim 9, wherein each DC/DC buck converter of said first plurality of DC/DC buck converters comprises a bi-directional three-level buck converter comprising:
    a DC input stage comprising at least two branches; and
    a DC output stage at which the at least two branches are interleaved.

14. A direct current (DC) charging station for electric vehicles, said DC charging station comprising:
    a multi-winding step-down transformer configured to be coupled to a three-phase alternating current (AC) power source, said multi-winding step-down transformer configured to generate a first three-phase AC voltage;

an AC distribution bus coupled to said multi-winding step-down transformer and configured to supply the first three-phase AC voltage;

a plurality of DC fast charging modules, each DC fast charging module of said plurality of DC fast charging modules comprising:

a neutral-point clamped (NPC) rectifier coupled to said AC distribution bus and configured to convert the first three-phase AC voltage to a first DC voltage at a rectifier output stage;

a DC distribution bus coupled to said rectifier output stage; and a plurality of DC/DC buck converters, each DC/DC buck converter of said plurality of DC/DC buck converters comprising a first DC stage coupled to said DC distribution bus and a second DC stage configured to be coupled to a respective electric vehicle, each DC/DC buck converter of said plurality of DC/DC buck converters configured to convert the first DC voltage to a respective second DC voltage to be supplied to the respective electric vehicle;

wherein said plurality of DC/DC buck converters comprises:

a first DC/DC buck converter configured to couple to a first electric vehicle having a first battery at a first state of charge; and a second DC/DC buck converter configured to couple to a second electric vehicle having a second battery at a second state of charge;

wherein, when said first state of charge of said first battery comprises a higher state of charge than said second state of charge of said second battery, said first DC/DC buck converter is configured to supply current from said first battery to said DC distribution bus; and wherein, when said second state of charge of said second battery comprises a higher state of charge than said first state of charge of said first battery, said second DC/DC buck converter is configured to supply current from said second battery to said DC distribution bus;

one or more storage batteries; and one or more battery DC/DC power converters equal in number to said one or more storage batteries, each battery DC/DC power converter of said one or more battery DC/DC power converters coupled to a respective storage battery of said one or more storage batteries and configured to charge said respective storage battery during a low-demand period of time and supply current from said respective storage battery during a peak-demand period of time.

15. The DC charging station in accordance with claim 14, wherein said NPC rectifier, of each DC fast charging module of the plurality of DC fast charging modules, comprises an NPC 3-level converter and a reverse-blocking insulated-gate bipolar transistor (IGBT).

16. The DC charging station in accordance with claim 14, wherein each DC/DC buck converter of said plurality of DC/DC buck converters, of each DC fast charging module of the plurality of DC fast charging modules, comprises a bi-directional three-level buck converter comprising:

a DC input stage comprising at least two branches; and a DC output stage at which the at least two branches are interleaved.

17. The DC charging station in accordance with claim 14, wherein each DC/DC buck converter of said plurality of DC/DC buck converters, of each DC fast charging module of the plurality of DC fast charging modules, comprises a uni-directional three-level buck converter comprising:

a DC input stage comprising at least two branches; and a DC output stage at which the two branches are interleaved.

18. The DC charging station in accordance with claim 14, wherein each DC/DC buck converter of said plurality of DC/DC buck converters, of each DC fast charging module of the plurality of DC fast charging modules, comprises a bi-directional three-level buck converter comprising:

a DC input stage comprising at least two branches; and a DC output stage at which the two branches are interleaved.

19. The DC charging station in accordance with claim 14, wherein said one or more storage batteries is one central storage battery coupled to said DC distribution bus of one DC fast charging module of said plurality of DC fast charging modules;

wherein said one or more battery DC/DC power converters is one battery DC/DC power converter coupling said one central storage battery to said DC distribution bus and configured to charge said one central storage battery from said DC distribution bus during a low-demand period of time and supply current from said one central storage battery to said DC distribution bus during a peak-demand period of time.

20. The DC charging station in accordance with claim 14, wherein said one or more storage batteries is a plurality of central storage batteries, each central storage battery of said plurality of central storage batteries coupled to said DC distribution bus of a respective DC fast charging module of said plurality of DC fast charging modules;

wherein said one or more battery DC/DC power converters comprises a plurality of battery DC/DC power converters, each battery DC/DC power converter of said plurality of battery DC/DC power converters coupling a respective central storage battery to said DC distribution bus of said respective DC fast charging module of said plurality of DC fast charging modules and configured to charge said respective central storage battery from said DC distribution bus during a low-demand period of time and supply current from said respective central storage battery to said DC distribution bus during a peak-demand period of time.

* * * * *